United States Patent [19]

Messick

[11] 4,186,126

[45] Jan. 29, 1980

[54] SULFONATE ANTIOXIDANTS FOR SYNTHETIC AND NATURAL RUBBER

[76] Inventor: John J. Messick, #28 Hacienda de Jiquilpan, Mexico City, Mexico

[21] Appl. No.: 895,403

[22] Filed: Apr. 11, 1978

[51] Int. Cl.² .............................................. C08K 5/42
[52] U.S. Cl. ............................ 260/45.9 AA; 260/801
[58] Field of Search ............... 260/501.19, 45.7 S, 260/45.9 R, 45.9 AA, 801, 798, 799, 769; 526/3

[56] References Cited

U.S. PATENT DOCUMENTS

| | | | |
|---|---|---|---|
| 2,289,760 | 7/1942 | Dickey et al. | 260/501.19 |
| 2,814,656 | 11/1957 | Janssen | 260/769 |
| 2,853,453 | 9/1958 | Elton et al. | 260/DIG. 15 |
| 3,699,066 | 10/1972 | Hunsucker | 260/501.19 |
| 3,787,341 | 1/1974 | Aron | 260/23.7 M |
| 3,923,708 | 12/1975 | Furukawa et al. | 260/DIG. 15 |

Primary Examiner—V. P. Hoke
Attorney, Agent, or Firm—Pollock, Vande Sande & Priddy

[57] ABSTRACT

Reaction product of alkanol amine and an arylsufonic acid and/or an alkyl substituted arylsufonic acid is used as an antioxidant in rubber compositions.

19 Claims, No Drawings

SULFONATE ANTIOXIDANTS FOR SYNTHETIC AND NATURAL RUBBER

FIELD OF INVENTION

The present invention relates to the use of certain alkanol amine salts of aryl- or alkaryl sulfonic acids as antioxidants. The present invention is especially suitable for providing non-staining antioxidants for natural and synthetic rubber compositions.

BACKGROUND OF INVENTION

Synthetic and natural polymers are attacked by oxygen and eventually may become useless for their intended purpose. The chemical reaction by means of which oxygen attacks and degrades many such materials is a free radical chain reaction. Free radicals are produced by abstraction of hydrogen atoms from the molecules of the material by light, heat, mechanical action, active molecules and the like.

The free radicals are extremely reactive in the presence of air and oxygen, forming peroxide radicals, which in turn abstract hydrogen atoms from the molecules to form additional radicals. These again react with oxygen in the same manner. Thus, once started, the reaction is a self-perpetuating degradative continuous chain reaction until stopped. In order to prevent such degradation, various antioxidants have been added which in most instances react with and destroy the intermediate chemical-free radicals as they form, without producing equally reactive intermediates.

Work is continually being done to obtain compounds with improved antioxidative properties particularly for natural and synthetic rubbers, since a number of the more highly commercial uses of natural and synthetic rubbers involve subjecting the rubber to conditions which promote oxidation. Antioxidants for rubbers are generally classified as staining antioxidants if they stain or discolor the rubber or as non-staining antioxidants if they do not substantially change the color the rubber. It has been noted that generally those antioxidants which are of the staining type provide better protection that those which do not stain. Therefore, depending upon the use of the composition, either the amount of protection against oxidation or the color of the material has been compromised. Accordingly, it is an object of the present invention to provide an antioxidant which is non-staining and which also provides as good as if not better protection against oxidation than the commercially available staining types of antioxidants. A further object of the present invention is to provide antioxidants which are relatively inexpensive to produce and which are effective in a myriad of compositions.

SUMMARY OF THE INVENTION

The present invention is directed to a polymer composition containing as an antioxidant in an amount sufficient to retard the oxidation of the polymer, an alkanol amine salt of an arylsulfonic acid and/or of an alkyl substituted aryl sulfonic acid. The aryl sulfonic acid and/or the alkyl substituted aryl sulfonic acid contain at least 10 carbon atoms, preferably at least 18 carbon atoms, and most preferably at least 19 carbon atoms.

The antioxidant is employed in combination with natural polymers and/or synthetic polymers.

The preferred sulfonates employed according to the present invention are sulfonates of monoethanol amine having the formula of:

$$C_nH_{2n+1}C_6H_5SO_3NHCH_2CH_2OH$$

wherein $n > 12$.

DESCRIPTION OF PREFERRED EMBODIMENTS

The compounds employed in the present invention are alkanol amine salts of arylsulfonic acids and/or of alkyl substituted aryl sulfonic acids having at least 10 carbon atoms, preferably at least 18 carbon atoms, and most preferably at 19 carbon atoms. The alkanol amines include the mono- and di-alkanol amines and preferably the monoalkanol amines such as monoethanol amine, monopropanol amine, monoisopropanol amine, and monobutanol amine. The alkanol amines suitable for the present invention usually contain up to 4 carbon atoms. The preferred alcohol amine is monoethanol amine.

The aryl sulfonic acids and alkyl substituted aryl sulfonic acids employed in obtaining the antioxidants of the present invention contain at least 10 carbon atoms and generally up to about 36 carbon atoms. Preferably, the alkyl substituted sulfonic acids contain at least about 18 carbon atoms, and most preferably at least about 19 carbon atoms. The alkyl substituted arylsulfonic acids are generally mono- and/or di- and/or trialkyl substituted.

Suitable sulfonic acids include naphthalene sulfonic acid and benzene sulfonic acid and preferably the mono alkyl substituted benzene sulfonic acids. Particularly advantageous sulfonic acids employed according to the present invention which are very economical are prepared from the alkylated bottoms obtained as a by-product from the manufacturing of dodecylbenzene. The alkylated bottoms usually includes mixtures of hydrocarbons containing about 24 to about 30 carbon atoms.

Those benzene sulfonates having more than twelve carbon atoms in the alkyl substituent are preferred over dodecylbenzene sulfonate since the former are more soluble in natural and synthetic rubbers, less volatile and are less expensive to produce thereby providing a more effective yet less expensive antioxidant.

The preferred antioxidants according to the present invention have the following structural formula:

$$R_1R_2SO_3NHR_3OH$$

wherein:

$R_1$ is an alkyl radical containing at least 12 carbon atoms and preferably at least 13 carbon atoms;

$R_2$ is an aryl radical containing at least 6 carbon atoms; and $R_3$ is an alkylene group containing up to about 4 carbon atoms.

Examples of suitable sulfonic acids in addition to the preferred alkylated bottoms include dodecylbenzene sulfonic acid, tridecylbenzene sulfonic acid, and naphthalene sulfonic acid.

A suitable material employed according to the present invention can be obtained by first reacting an alkylated bottom from the production of dodecyl benzene with fuming sulfuric acid (e.g.—oleum 30%). The mixture in the alkylated bottoms may contain in addition to the C$_{24}$ to C$_{30}$ hydrocarbons other hydrocarbons including minor amounts of dodecylbenzene. The oleum is added until a maximum temperature of 80° C. is attained. The exothermic reaction with the sulfuric acid is continued until a sulfonic acid which is at least a 50% and preferably at least an 80% concentration in the reaction mixture is obtained.

The spent sulfuric acid is then removed first by settling and then by centrifuging. The mixture of sulfonic acid and unreacted bottoms (e.g. unreacted oils) is then reacted with the alkanol amine. The amine is added until a maximum temperature of about 70° C. is attained. The reaction with the amine is exothermic. When the product is to be employed as an antioxidant for rubbers, the pH of the mixture after the addition of the amine is preferably about 7.5. When the product is to be employed as an antioxidant for latex compositions, the pH of the mixture after the addition of the amine is preferably about 8. It is further noted that during the reaction, a foam is created.

The antioxidants of the present invention are employed in amounts sufficient to exhibit an antioxidation effect. The amount of antioxidant needed to retard the oxidation of a particular amount of polymer can obviously be varied over a wide range of proportions depending upon the identity of the specific polymer, the desired degree of stabilization, and the environment in which the polymer is to be used. An amount of about 0.1% by weight based upon the material to be stabilized has been found to be quite effective for instance in latex. The threshold amount at which the compounds of the present invention are effective is about 0.05% by weight based upon the weight of the polymer to be stabilized. The materials of the present invention are used in amounts as high as 3% by weight or higher based upon the weight of the material to be stabilized. However, excellent stabilization is achieved at amounts of about 1% by weight, and higher amounts are not justified on a cost effectiveness basis.

The compounds employed according to the present invention in addition to being excellent antioxidants are very economical to prepare, are non-staining, non-toxic and can be used at low concentrations. Moreover, it has been found that the materials also inhibit deterioration of materials due to ozone exposure. Also, the compounds employed according to the present invention reduce the tendency of polymeric materials to crack. The materials employed according to the present invention tend to maintain the physical properties of the polymer to which it is added.

Among the synthetic sulfur-curable rubbers to which the present invention is suitable are the diene rubbers such as polyisoprene, polybutadiene, copolymers of conjugated dienes (e.g. butadiene) and at least one other copolymerizable monomer such as styrene, acrylonitrile, methyl acrylate and 2-vinylpyridine. Other polymers to which the present invention can be employed include polyolefins such as polyethylene, polypropylene, and polybutene; polyesters; polyacetals; polyepoxides; polystyrene; polyacrylates; polyurethenes and the like. In addition the compounds of the present invention can be employed in cellulosic polymers such as nitrocellulose. The antioxidants should generally not be added prior to the initial polymerization or formation of the polymer. It is usually added sometime prior to the final processing of the composition in the same way as the prior art antioxidants are added.

Although certain ethanol amine sulfonates have been employed in a limited number of polymer compositions, there has been no explicit suggestion in the prior art that such would provide the type of antioxidation activity as achieved according to the present invention. For instance, U.S. Pat. No. 3,401,047 to Garden et al. suggests the addition of a number of different sulfur compounds including ethanol amine dodecyl benzene sulphonate to nitrocellulose lacquers as an anti-static agent therein. The amount of anti-static agent employed is usually from about 5 to about 20 parts per 100 parts of the nitrocellulose. Garden et al. however, do not suggest that the compounds therein act as antioxidants in nitrocellulose.

U.S. Pat. No. 2,880,186 to Barth suggests the use of various emulsifiers in the preparation of carboxyl containing diene polymers which polymers are then admixed with natural rubber. Among the emulsifiers are suggested amine salts of alkyl aryl sulfonates. In addition, Barth suggests that the alkyl group of the sulphonates can be from 10 to 20 carbon atoms. However, since Barth also employs a peroxide (potassium persulfate) in the composition and if this material is not entirely auto-consumed or poisoned in the reaction, any possible antioxidation effect from the emulsifier in the amounts present would be offset by the presence of the peroxide and its antioxidation effect, if any, would not be realized nor apparent from the disclosure therein. Moreover, Barth further discloses adding a shortstopping agent (2-5 di-tert-butyl hydroquinone) which is a good antioxidant.

U.S. Pat. No. 3,953,481 to Wodell suggests the use of various sulfonic acid salts as condensation catalysts. The sulfonic acid can be an alkyl benzene sulfonic acid wherein the alkyl group contains from 10 to 18 carbon atoms. Moreover, this patent suggests amines such as ethanolamine. However, there is no suggestion in Wodell that the materials therein would be effective antioxidants. It is further believed that any possible antioxidant effect would not be realized because the condensation catalysts would be subjected to materials, formed as byproducts during the condensation, which tend to destroy the catalysts.

U.S. Pat. No. 3,592,879 to Ott et al. is of interest since it suggests the use of a mixture of a dialkanol alkyl amine and a sulphonate as an antistatic agent. However, Ott et al. merely discloses a mixture of materials and not the conditions and reactants which would produce the amine sulphonates as required by the present invention to achieve antioxidant properties. Ott et al. does not suggest a sulfonic acid as is required according to the present invention for reacting with the amine to form the sulphonate.

U.S. Pat. Nos. 2,731,420 to Sylvester and 3,630,935 to Potter Jr. are of interest since they suggest detergent compositions which can include a sulphonic acid having alkyl groups of 8 to 22 carbon atoms and 8 to 18 carbon atoms respectively. Included in a long list of materials for obtaining the salts are alkanol amines such as monethanol amine.

It is theorized that in view of the dissimilarity of the chemical structure and properties of the antioxidants employed in the present invention as compared to the more common commercially available antioxidants that probably the antioxidants of the present invention function in a manner different from that discussed hereinbefore for the common antioxidants. In particular, it seems apparent that not one but several protective mechanisms act upon a system depending on the shape, density, crosslinking, and the chemical composition of the particular molecules. However, almost all macromolecules have a common characteristic which is a large size which imparts to the macromolecule an extensive surface area and subsequent surface energy. For instance, see Williams and Williams, BASIC PHYSICAL CHEMISTRY, W. H. Freeman and Company, San Francisco, 1967, Page 250. This surface provides adsorption characteristics not found in small molecular systems. A surface has energy which can be demonstrated experimentally as exemplified by Williams and Williams, supra, page 251. If a film is stretched, on release it will spontaneously contract. This contraction lifts a small weight thereby doing useful work which comes from the surface energy of the film.

The contraction of the film described above, is a consequence of the second law of thermodynamics which states that a system has a natural tendency to reduce its free energy. For example, see Lewis and Randall, THERMODYNAMICS. McGraw-Hill, New York, 1961. Pages 75-85. If a system cannot reduce its energy by contraction, then it will adsorb substances onto its surface, provided that the substances will lower its surface energy. The total free surface energy of most solids, is much higher than that of liquids, and the lowering of free surface energy by adsorbed material on solids is correspondingly much greater than in liquids. See Orowan, E.:Z. Physik, 82. Pages 239, 259 (1933).

The general thermodynamic treatment of adsorption was derived by Biggs in 1876. (Langmuir and Schaefer, J. AMER CHEM. SOC., 1937, 59, 2400.) Langmuir derived his equation from the analysis of the mechanism of the adsorption process. He considered a crystal surface onto which gas molecules would be colliding and rebounding. The rate at which molecules would be adsorbed would depend on the number striking the surface per second, the fraction of incident molecules that adhered to "the area" not already covered by the adsorbed molecules and the pressure at which this occurs. He considered the crystal to be irregular and he proposed that the adsorption would take place at certain sites or active centers. Any reduction in the number of active centers would automatically lead to a rate reduction of the adsorption and thereby achieve equilibrium.

In view of this, it is believed that if the number of active centers were reduced in a polymer such as a rubber, the polymer would adsorb less gas (e.g. less oxygen), thereby protecting it since the active centers in the polymer molecules would have achieved an equilibrium state. If these active centers are neutralized, in effect, the overall surface energy of the polymer molecule has been reduced along with its tendency to adsorb material onto its surface. If oxygen is prevented from being absorbed onto the surface of the rubber molecule by a lesser magnitude, then, automatically, the chemical reactions such as peroxide decomposition and oxygen attack on hydrocarbons, produced by chemisorption of oxygen on the surface, will be reduced by several magnitudes leaving stable products.

Current knowledge concerning the above-discussed active centers is still very limited. For instance, a variety of forces such as coulombic forces associated with ionic bonds, can be assumed to be of great importance as well as Van der Waals forces arising from the formation of polar bonds between hydrocarbon groups and from the formation of apolar bonds between hydrophilic groups. Surface chemistry and the physics of interfaces explain that surface active agents effect the surface of a substrate. That surface active agents are ion-exchangers, charge reducers, or in some cases, charge eliminators, has been known for some time. Accordingly, if it is assumed that the active center is cationic or positive then an anionic agent (negative) should occupy the site thereby reducing the tendency of gas adsorption. It is understood that the active center being positive does not imply that the polymer is necessarily cationic but rather is intended to indicate that it is more positive than other portions of the polymer so as to attract oxygen to a greater extent. It must be recognized that the above theory is highly empirical.

It is theorized that the sulfonate employed according to the present invention provide antioxidant activity by coating the polymer particles such as rubber fibers thereby preventing oxygen from attacking the particles themselves and/or by neutralizing by being absorbed onto free metallic contaminants such as group IV metals (e.g. iron, cobalt and selenium) compositions or chemically neutralizing unreacted acids such as oxalic acid, which can act as a catalyst for peroxidation reactions.

The following examples are provided which further illustrate the present invention.

EXAMPLE 1

Three separate compositions containing about 100 parts by weight of natural rubber, about 5 parts by weight of zinc oxide, about 1 part by weight of stearic acid, about 80 parts by weight of calcium carbonate, about 1 part by weight of mercaptobenzothiazole sulfide, about 3 parts by weight of sulfur, and about 1 part by weight of the antioxidants identified in the table 1 below are obtained. The compositions also contained a few ppm of silicone antifoam (Dow Corning 200 fluid). The compositions are subject to standard ASTM procedures (ASTM D-412) for testing antioxidation effects, the results of which are provided in the table 1 below.

TABLE 1

| ANTIOXIDANT | ORIGINAL PROPERTIES | | | |
|---|---|---|---|---|
| | Modulus 300% | Rupture Charge (Tensile Strength) | Maximum Elongation | Hardness Shore A |
| $C_mH_{2m+1}$ $C_6H_5SO_3NHCH_2CH_2OH$, 60% concentration in oil, $C_mH_{2m+1}C_6H_5$ moiety is from alkylated bottoms from preparation of dodecyl benzene. m predominately 18-24. | 450 | 2295 | 610 | 51 |
| A first styrenated phenol | 445 | 1965 | 630 | 49 |
| A second styrenated phenol | 420 | 1750 | 620 | 48 |

| ANTIOXIDANT | PROPERTIES AFTER HEAT AGING 70 HOURS AT 70° C. | | | |
|---|---|---|---|---|
| | Modulus 300% | Rupture Charge (Tensile Strength) | Maximum Elongation | Hardness Shore A |
| $C_mH_{2m+1}$ $C_6H_5SO_3NHCH_2CH_2OH$, 60% concentration in oil, $C_mH_{2m+1}C_6H_5$ moiety is from alkylated bottoms | 750 | 2190 | 560 | 56 |

TABLE 1-continued

| ANTIOXIDANT | Modulus 300% | Rupture Charge (Tensile Strength) | Maximum Elongation | Hardness Shore A |
|---|---|---|---|---|
| $C_mH_{2m+1}C_6H_5SO_3NHCH_2CH_2OH$, 60% concentration in oil, $C_mH_{2m+1}C_6H_5$ moiety is from alkylated bottoms from preparation of dodecyl benzene. m predominately 18-24. | 595 | 1925 | 570 | 55 |
| A first styrenated phenol | 555 | 2075 | 640 | 53 |
| A second styrenated phenol | | | | |

PROPERTIES AFTER HEAT AGING 70 HOURS AT 100° C.

| ANTIOXIDANT | Modulus 300% | Rupture Charge (Tensile Strength) | Maximum Elongation | Hardness Shore A |
|---|---|---|---|---|
| $C_mH_{2m+1}C_6H_5SO_3NHCH_2CH_2OH$, 60% concentration in oil, $C_mH_{2m+1}C_6H_5$ moiety is from alkylated bottoms from preparation of dodecyl benzene. m predominately 18-24. | 450 | 1530 | 460 | 52 |
| A first styrenated phenol | 485 | 1095 | 510 | 52 |
| A second styrenated phenol | 420 | 470 | 350 | 49 |

EXAMPLE 2

Three separate compositions containing about 100 parts by weight of natural rubber, about 5 parts by weight of zinc oxide, about 2.5 parts of stearic acid, about 2 parts by weight of a coumarone-indene resin tackifier (KW10), about 400 parts of carbon black (FEC); about 3 parts by weight of a plasticizer oil, about 1 part by weight of mercaptobenzothiazole accelerator, about 2.8 parts of sulfur and about 1 part by weight of the antioxidants identified in the table 2 below are obtained. The compositions are subjected to standard ASTM procedures (ASTM D-412) for testing antioxidation effects, the results of which are provided in the Table 2 below:

TABLE 2

ORIGINAL PROPERTIES

| ANTIOXIDANT | Modulus 300% | Rupture Charge (Tensile Strength) | Maximum elongation | Hardness Shore A |
|---|---|---|---|---|
| $C_mH_{2m+1}C_6H_5SO_3NHCH_2CH_2OH$, 80% concentration in oil. $C_mH_{2m+1}C_6H_5$ moiety is from alkylated bottoms from preparation of dodecyl benzene. m predominately 18-24. | 1455 | 3675 | 540 | 62 |
| Condensate of aniline and acetone | 1435 | 3015 | 490 | 60 |
| Diphenylamine | 1400 | 3170 | 510 | 60 |

PROPERTIES AFTER 7 DAYS AGING

| ANTIOXIDANT | Modulus 300% | Rupture Charge (Tensile Strength) | Maximum Elongation | Hardness Shore A |
|---|---|---|---|---|
| $C_mH_{2m+1}C_6H_5SO_3NHCH_2CH_2OH$, 80% concentration in oil. $C_mH_{2m+1}C_6H_5$ moiety is from alkylated bottoms from preparation of dodecyl benzene. m predominately 18-24. | 1980 | 3045 | 420 | 66 |
| Condensate of aniline and acetone | 2305 | 3000 | 400 | 63 |
| Diphenylamine | 1820 | 2710 | 400 | 60 |

PROPERTIES AFTER 14 DAYS AGING

| ANTIOXIDANT | Modulus 300% | Rupture Charge (Tensile Strength) | Maximum Elongation | Hardness Shore A |
|---|---|---|---|---|
| $C_mH_{2m+1}C_6H_5SO_3NHCH_2CH_2OH$, 80% concentration in oil. $C_mH_{2m+1}C_6H_5$ moiety is from alkylated bottoms from preparation of dodecyl benzene. m predominately 18-24. | 2075 | 3035 | 420 | 66 |
| Condensate of aniline and acetone | 1985 | 2855 | 390 | 65 |
| Diphenylamine | 1930 | 2875 | 410 | 61 |

EXAMPLE 3

Three separate compositions containing about 100 parts by weight of natural rubber, about 5 parts by weight of zinc oxide, about 1 part by weight of stearic acid, about 80 parts by weight of calcium carbonate, about 1 part by weight of MBTS, about 3 parts by weight of sulfur, and about 1 part by weight of the antioxidants identified in the table 3 below are obtained. The compositions are subjected to standard ASTM procedures (ASTM D-412) for testing antioxidation effects, the results of which are provided in Table 3 below:

TABLE 3

ORIGINAL PROPERTIES

| ANTIOXIDANT | Modulus 300% | Rupture Charge (Tensile Strength) | Maximum Elongation | Hardness Shore A |
|---|---|---|---|---|
| $C_mH_{2m+1}C_6H_5SO_3NHCH_2CH_2OH$, 50% concentration in oil. $C_mH_{2m+1}C_6H_5$ moiety is from alkylated bottoms from preparation of dodecyl benzene. m predominately 18-24. | 980 | 2190 | 510 | 60 |
| BHT Butyl hydroxy toluene | 725 | 1970 | 560 | 57 |
| Diphenylamine | 845 | 2245 | 540 | 60 |

PROPERTIES AFTER HEAT AGING 70 HOURS AT 100° C.

| ANTIOXIDANT | Modulus 300% | Rupture Charge (Tensile Strength) | Maximum Elongation | Hardness Shore A |
|---|---|---|---|---|
| $C_6H_5SO_3NHCH_2CH_2OH$, 50% concentration in oil. $C_mH_{2m+1}C_6H_5$ moiety is from alkylated bottoms | 1640 | 860 | 290 | 60 |

TABLE 3-continued

| from preparation of dodecyl benzene. m predominately 18-24 BHT | | | | |
|---|---|---|---|---|
| Butyl hydroxy toluene | 860 | 895 | 300 | 60 |
| Diphenylamine | 1390 | 790 | 150 | 68 |

An analysis of the above tables indicates that the antioxidants employed according to the present invention provide a very good combination of desirable properties as compared to the commercial antioxidants tested. Although there may be certain tests which show a better performance by a particular prior art antioxidant, when all of the tests are analyzed together, the indication is that the antioxidants of the present invention provided the better overall combination of properties as compared to the antioxidants tested.

It has further been observed that various anionic containing and non-ionic surface active agents outside of the scope of the present invention did not provide the type of protection against oxidation as achieved by the present invention.

What is claimed is:

1. A composition containing a material selected from the group of synthetic rubber, natural rubber, and mixtures thereof and as an antioxidant in an amount sufficient to retard oxidation of said material up to about 3% by weight of an alkanolamine salt of a sulfonic acid selected from the group of arylsulfonic acids, alkyl substituted arylsulfonic acids, and mixtures thereof, provided said sulfonic acid contains at least 10 carbon atoms, said alkanolamine is selected from the group of monoalkanolamines, dialkanolamines and mixtures thereof, and wherein said alkanolamine contains up to 4 carbon atoms, and wherein only hydrogen and alkanol groups are directly attached to nitrogen atom of said alkanolamine.

2. The composition of claim 1 wherein said sulfonic acid is selected from the group of naphthalene sulfonic acid, alkyl substituted derivatives thereof, alkyl substituted derivatives of benzenesulfonic acid, and mixtures thereof.

3. The composition of claim 1 wherein said alkanolamine is monoethanol amine.

4. The composition of claim 1 wherein said antioxidant is present in an amount of at least about 0.05% by weight based upon the weight of said material.

5. The composition of claim 1 wherein said antioxidant is present in an amount up to about 1% by weight based upon the weight of said material.

6. A composition containing a material selected from the group of synthetic rubber, natural rubber, and mixtures thereof and as an antioxidant in an amount sufficient to retard oxidation of said material an alkanolamine salt of a sulfonic acid selected from the group consisting of arylsulfonic acids, alkyl substituted arylsulfonic acids and mixtures thereof, provided said sulfonic acid contains at least 10 carbon atoms, said alkanolamine is selected from the group of monoalkanolamines, dialkanolamines, and mixtures thereof, and wherein said alkanolamine contains up to 4 carbon atoms, and wherein only hydrogen and alkanol groups are directly attached to nitrogen atom of said alkanolamine.

7. The composition of claim 6 wherein said sulfonic acid is selected from the group of naphthalene sulfonic acid, alkyl substituted derivatives thereof, alkyl substituted derivatives of benzenesulfonic acid, and mixtures thereof.

8. The composition of claim 6 wherein said alkanolamine is monoethanol amine.

9. A composition containing a material selected from the group of synthetic polymers, natural polymers, and mixtures thereof and as an antioxidant in an amount sufficient to retard oxidation of said material an alkanolamine salt of a sulfonic acid selected from the group of arylsulfonic acids, alkyl substituted arylsulfonic acids and mixtures thereof, provided said sulfonic acid contains at least 19 carbon atoms, said alkanolamine is selected from the group of monoalkanolaamines, dialkanolamines and mixtures thereof, and wherein said alkanolamines contain up to 4 carbon atoms, and wherein only hydrogen and alkanol groups are directly attached to nitrogen atom of said aklanolamine.

10. The composition of claim 9 wherein said sulfonic acid is selected from the group of alkyl substituted benzene sulfonic acids, alkyl substituted naphthalene sulfonic acid, and mixtures thereof.

11. The composition of claim 9 wherein said alkanolamine is monoethanol amine.

12. The composition of claim 9 wherein said sulfonic acid is obtained by reacting alkylated products from the production of dodecyl benzene with sulfuric acid.

13. The composition of claim 9 wherein said antioxidant represented by the formula:

$R_1R_2SO_3NHR_3OH$ wherein $R_1$ is an alkyl radical containing at least 13 carbon atoms, $R_2$ is an aryl radical containing at least 6 carbon atoms; and $R_3$ is an alkylene group containing up to about 4 carbon atoms.

14. The composition of claim 9 wherein said antioxidant is represented by the formula:

$C_mH_{2m+1}C_6H_5SO_3NHCH_2CH_2OH$ wherein $m > 12$.

15. The composition of claim 14 wherein $m = 18-24$.

16. The composition of claim 9 wherein said antioxidant is present in an amount of at least about 0.05% by weight based upon the weight of said material.

17. The composition of claim 9 wherein said antioxidant is present in an amount up to about 3% by weight.

18. The composition of claim 9 wherein said material is selected from the group of natural rubber, synthetic rubber, and mixtures thereof.

19. The composition of claim 9 wherein said antioxidant is present in an amount of up to about 1% by weight based upon the weight of said material.

* * * * *

UNITED STATES PATENT AND TRADEMARK OFFICE
CERTIFICATE OF CORRECTION

PATENT NO. : 4,186,126

DATED : January 29, 1980

INVENTOR(S) : Messick

It is certified that error appears in the above-identified patent and that said Letters Patent is hereby corrected as shown below:

In Column 6, lines 46-47 and lines 63-64;
In column 7, lines 15-16, 49-50, 66-67;
In column 8, lines 16-17, 47-48 and
In column 10, line 46 change the formula "$C_mH_{2m+1}C_6H_5SO_3NHCH_2CH_2OH$" to $--C_mH_{2m+1}C_6H_4SO_3NHCH_2CH_2OH--$.

In column 8, line 64 change "$C_6H_5SO_3NHCH_2CH_2OH$" to $--C_mH_{2m+1}C_6H_4NHCH_2CH_2OH--$.

In column 6, lines 49, 66;
In column 7, lines 18, 52, 68; and
In column 8, lines 19, 49 and 66 delete the formula "$C_mH_{2m+1}C_6H_5$" and insert therefor $--C_mH_{2m+1}C_6H_4--$.

Signed and Sealed this

Second Day of February, 1988

*Attest:*

DONALD J. QUIGG

*Attesting Officer*   *Commissioner of Patents and Trademarks*